(12) United States Patent
Thakur et al.

(10) Patent No.: US 9,832,627 B2
(45) Date of Patent: Nov. 28, 2017

(54) METHOD AND SYSTEM TO INCLUDE TETRA SS-LE MEMBER IN PUBLIC SAFETY (PS) LONG TERM EVOLUTION GROUP CALL SERVICE

(71) Applicant: Tata Consultancy Services Limited, Mumbai (IN)

(72) Inventors: Mayur Gajanan Thakur, Mumbai (IN); Abhijit Shaileshchandra Save, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/141,326

(22) Filed: Apr. 28, 2016

(65) Prior Publication Data

US 2016/0323728 A1 Nov. 3, 2016

(30) Foreign Application Priority Data

Apr. 29, 2015 (IN) .......................... 1709/MUM/2015

(51) Int. Cl.
| | |
|---|---|
| *H04W 4/22* | (2009.01) |
| *H04W 4/16* | (2009.01) |
| *H04W 76/00* | (2009.01) |
| *H04L 29/06* | (2006.01) |
| *H04W 4/08* | (2009.01) |
| *H04W 88/16* | (2009.01) |

(52) U.S. Cl.
CPC ........... *H04W 4/22* (2013.01); *H04L 65/1006* (2013.01); *H04L 65/403* (2013.01); *H04W 4/08* (2013.01);

(Continued)

(58) Field of Classification Search
CPC ....... H04W 4/22; H04W 4/16; H04W 76/007; H04W 4/08; H04W 88/16; H04L 65/1006; H04L 65/403

(Continued)

(56) References Cited

U.S. PATENT DOCUMENTS

| | | | |
|---|---|---|---|
| 8,634,799 | B1 | 1/2014 | Economy et al. |
| 8,855,012 | B1 | 10/2014 | Suri |

(Continued)

FOREIGN PATENT DOCUMENTS

| | | |
|---|---|---|
| CN | 102647684 | 8/2012 |

OTHER PUBLICATIONS

Eryon. (2014). "An Interoperability Solution between TETRA and LTE for Next Generation Emergency Services," Poster—Conference; 1 page.

*Primary Examiner* — Cong Tran
(74) *Attorney, Agent, or Firm* — Finnegan, Henderson, Farabow, Garrett & Dunner LLP (57) ABSTRACT

Method and system to include a TETRA member (subscriber) in an ongoing PS-LTE group call using SS-LE, by mapping a plurality of specific SS-LE messages is disclosed. The embodiments herein enable TETRA SS-LE service to interwork with PS LTE GCS. The process involves the steps of queuing the TETRA call leg at the PS LTE GCS AS, informing the TETRA SwMI to activate SS-LE for a TETRA member, embedding a SS-LE PDU as a payload in the SIP messaging module, defining and interrogating a SS-LE service on a GCS AS via the authorized user on the TETRA SwMI or on the PS-LTE network. The TETRA member is connected to the ongoing group call through a gateway. The TETRA SwMI works as the TETRA core and the LTE to TETRA Gateway facilitates the process of message mapping and protocol conversion.

15 Claims, 5 Drawing Sheets

(52) U.S. Cl.
CPC ............ *H04W 4/16* (2013.01); *H04W 76/007* (2013.01); *H04W 88/16* (2013.01)

(58) Field of Classification Search
USPC ......... 455/426.1, 404.1, 517–528, 90.2, 466, 455/414.1–414.4, 465; 370/433, 340, 370/310, 312, 338, 260–271, 389, 466, 370/352
See application file for complete search history.

(56) References Cited

U.S. PATENT DOCUMENTS

| | | | |
|---|---|---|---|
| 2002/0097718 A1* | 7/2002 | Korus | H04L 12/1854 370/390 |
| 2003/0177283 A1* | 9/2003 | Hamilton | H04M 3/4228 719/328 |
| 2006/0034260 A1* | 2/2006 | Svedberg | H04W 4/10 370/352 |
| 2009/0239527 A1* | 9/2009 | Forsten | H04W 4/10 455/426.1 |
| 2011/0016185 A1* | 1/2011 | Zwaal | H04L 65/104 709/206 |
| 2011/0110532 A1* | 5/2011 | Svendsen | H04M 9/082 381/93 |
| 2011/0200048 A1* | 8/2011 | Thi | H04B 3/23 370/392 |
| 2012/0155644 A1* | 6/2012 | Wealleans | H04W 12/02 380/270 |
| 2014/0241306 A1 | 8/2014 | Pison et al. | |

\* cited by examiner

METHOD AND SYSTEM TO INCLUDE TETRA SS-LE MEMBER IN PUBLIC SAFETY (PS) LONG TERM EVOLUTION GROUP CALL SERVICE

PRIORITY CLAIM

This U.S. patent application claims priority under 35 U.S.C. §119 to: India Application No. 1709/MUM/2015, filed on 29 Apr. 2015. The entire contents of the aforementioned application are incorporated herein by reference.

TECHNICAL FIELD

The embodiments herein generally relate to interoperability between Long term evolution (LTE) and Terrestrial Trunked Radio (TETRA) networks, and, more particularly, to including a TETRA Supplementary Service Late Entry (SS-LE) member in a public safety (PS) Long Term Evolution (LTE) group call service.

BACKGROUND

When unexpected incidents such as natural disasters, accidents, or wars occur, responding appropriately to these incidents can save lives, prevent damage and limit injuries. Situations that require effective and fast action demand that officials need to be equipped with the most dependable public safety communications technology. The networks on which the communication technology operates, facilitates locating mobile teams in real time, seamlessly communicate across agencies and can activate broadband in a given area. Usually, during emergencies there is no time for rescuers to be concerned about the communications technology. Subscribers should be able to communicate seamlessly across multiple agencies and centers.

Interoperable communications deliver a scalable, cost-effective Internet Protocol (IP)-based solution for quickly establishing communications between disparate systems in support of emergency response and other day to day operations. Interoperable communications provide connectivity to any disparate radio system and allows users from various departments to work together in any field and seamlessly connect to each other's remote command and control and dispatch facilities. Additionally, features such as advanced call signaling are provided so that subscribers can continue to use key features of call signaling such as an Emergency ID. The design of interoperable communications bridges are cost-effective and can be scalable to any size. Two of the commonly used interoperable communication networks are LTE and TETRA. With a growing consensus that operational data should be transponded over mission critical networks, a unified TETRA and PS-LTE offer several benefits.

Defined by the $3^{rd}$ Generation Partnership Project (3GPP), LTE is a wireless technology that enables wide area broadband communications. The key enablers or features of this technology are exceptional spectrum efficiency and high data rates. In addition to high data rates, defining characteristics of LTE are a flat, all-IP architecture and low latency.

TETRA is an open standard developed by the European telecommunication Standards Institute (ETSI). TETRA defines a digital private mobile radio system offering mission critical voice and narrow-bandwidth data services. TETRA networks enable wideband data rates of up to 80 kbps in a 50 kHz channel.

Operators of nationwide TETRA networks naturally want to protect their huge investments in these infrastructures. Though 3GPP has defined the standard to support mission critical group communications over LTE, the complete transition of Public Safety Services from TETRA to PS-LTE involves a significant duration.

Nevertheless, these narrowband TETRA networks need to be prepared for interworking with forthcoming broadband LTE networks. Although, LTE-TETRA interoperability to a partial extent is currently prevalent, several systems do not provide sufficient infrastructure when it comes to supporting mission critical communication. Further, some existing systems do not usually engage an inter-system interface between users owned network and a commercial mobile network.

SUMMARY

In one aspect, a method for enabling networking and inclusion of the TETRA SS-LE member in a PS-LTE server is provided. The method comprises queuing a call at a group call service application server for a SS-LE and informing a TETRA switching and management interface (SwMI) to activate the SS-LE for a TETRA subscriber. Further, the method includes embedding a SS-LE protocol data unit (PDU) as a payload in a Session Initiation Protocol (SIP) message body and defining and interrogating the SS-LE service on the group call application server by a TETRA subscriber on the TETRA SwMI.

In another aspect, a system for enabling networking and inclusion of at least one TETRA SS-LE member in a PS LTE server is provided. The system comprises of a group call application server configured to function as a controller for the group call, where the group call is hosted on the group call application server. The TETRA SwMI is configured to function as a TETRA core, where the TETRA SwMI serves a TETRA member. Further, a gateway is configured to perform a voice codec transcoding mechanism, where the mechanism includes at least one first Real Time Transport Protocol (RTP) packet to be converted to a first Algebraic code-excited linear prediction (ACELP) audio packet and a second ACELP audio packet to be converted into a second RTP packet. Furthermore, the Inter System Interface (ISI) protocol is configured to build a plurality of TETRA messages by using a TETRA network.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

Figure 1:
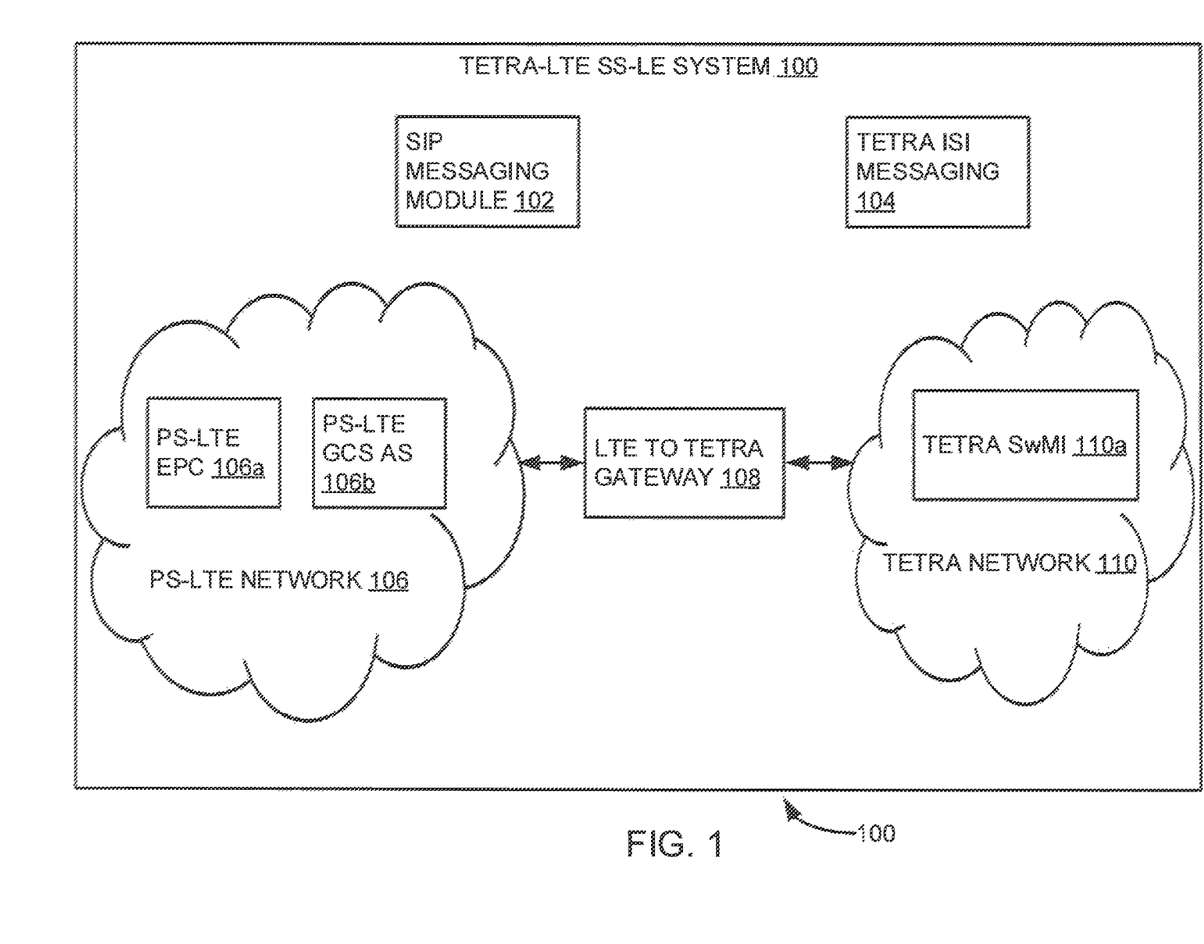
FIG. 1 illustrates a network implementation of a PS LTE-TETRA group call, according to an embodiment of the present disclosure.

FIG. 1 illustrates a network implementation of a PS LTE-TETRA group call, according to an embodiment of the present disclosure. As depicted in FIG. 1, a TETRA-LTE SS-LE system 100 is communicatively coupled to a PS LTE Network 106 and a TETRA Network 110.

In one implementation, the PS LTE Network 106 and the TETRA Network 110 can be a large network, including thousands of subscribers, servers, routers, blades, and other computing devices connected over the PS LTE Network 106 and the TETRA Network 110. In another implementation, the PS LTE Network 106 and the TETRA Network 110 can be a home network with a limited number of subscribers, server, router, blades connected over the PS LTE Network 106 and the TETRA Network 110.

The PS LTE Network 106 and the TETRA Network 110 may be a wireless network, a wired network, or a combination thereof. The PS LTE Network 106 and the TETRA Network 110 can also be an individual network or a collection of many such individual networks, interconnected with each other and functioning as a single large network, e.g., the Internet or an intranet. The PS LTE Network 106 and the TETRA Network 110 can be implemented as one of the different types of networks, such as intranet, local area network (LAN), wide area network (WAN), the internet, and such. The PS LTE Network 106 and the TETRA Network 110 may either be a dedicated network or a shared network, which represents an association of the different types of networks that use a variety of protocols.

As depicted in FIG. 1, the TETRA-LTE SS-LE System 100 comprises of a SIP messaging module 102, a TETRA ISI messaging 104, a PS-LTE EPC (Evolved Packet Core) 106a and a PS-LTE GCS AS (Group Call Application Server) 106b in a PS LTE network 106, a LTE to TETRA gateway 108 and a TETRA SwMI 110a in a TETRA Network 110. The PS-LTE GCS AS 106b functions as a controller for one or more group calls, and the group call is hosted on the PS-LTE GCS AS 106b.

The TETRA SwMI 110a is the TETRA core which serves a plurality of TETRA members. For the purpose of informing the TETRA members and to join an on-going group call via the SS-LE, the TETRA SwMI 110a performs an air interface messaging to a TETRA member. The TETRA member may be any user or subscriber who is on the TETRA Network 110. Further, the PS-LTE GCS AS 106b informs about the SS-LE service being activated to the TETRA SwMI 110a.

In one embodiment, TETRA ETSI standards defines a SS-LE ((ETSI EN 300 392-10-14 to EN 300 392-12-14).) The SS-LE enables the TETRA member (node or subscriber) to join the ongoing group call as a late entry. The SS-LE is a standard method in the TETRA SS-LE which offers several advantages for joining a group call late without any need for the group call to initiate multiple attempts to reach the TETRA member. The TETRA member as and when available is informed to join the ongoing group call. Although, the following specification uses the terminology "TETRA member", it is understood to refer to a node by the embodiments disclosed herein.

A normal group call setup between the PS-LTE Network 106 and the TETRA Network 110 requires the following preferences to be established:

a) The message mapping for establishing the ongoing group call can be based using a protocol called RFC 4497. RFC 4497 teaches interworking between the SIP and QSIG (Q Signaling). This standard provides a mapping of messages for a basic call setup.

b) Floor control can be established by mapping SIP based floor control (by using INFO or MESSAGE SIP methods) or RTCP based floor control to TETRA ISI floor control messages. Further, a voice codec transcoding is also needed on the LTE to TETRA Gateway 108, where the LTE to TETRA Gateway 108 converts the RTP packets to ACELP audio packets and vice versa.

The SS-LE comprises of the following entities:

An Authorized User (not shown in figure) is a User who defines the SS-LE services b) A User A (not shown in figure): A calling party in a call c) A User B (not shown in figure): A called party who receives the SS-LE indications for an ongoing group call.

d) The (home or controlling) SwMI (not shown in figure) is the TETRA core which controls the ongoing group call.

e) The SS-LE service is extended to a visited or participant SwMI 110a, since the visited or participant SwMI 110a facilitates a group call comprising one or more group members. The Visited or Participant SwMI 110a is a serving SwMI for the User B.

Figure 2:
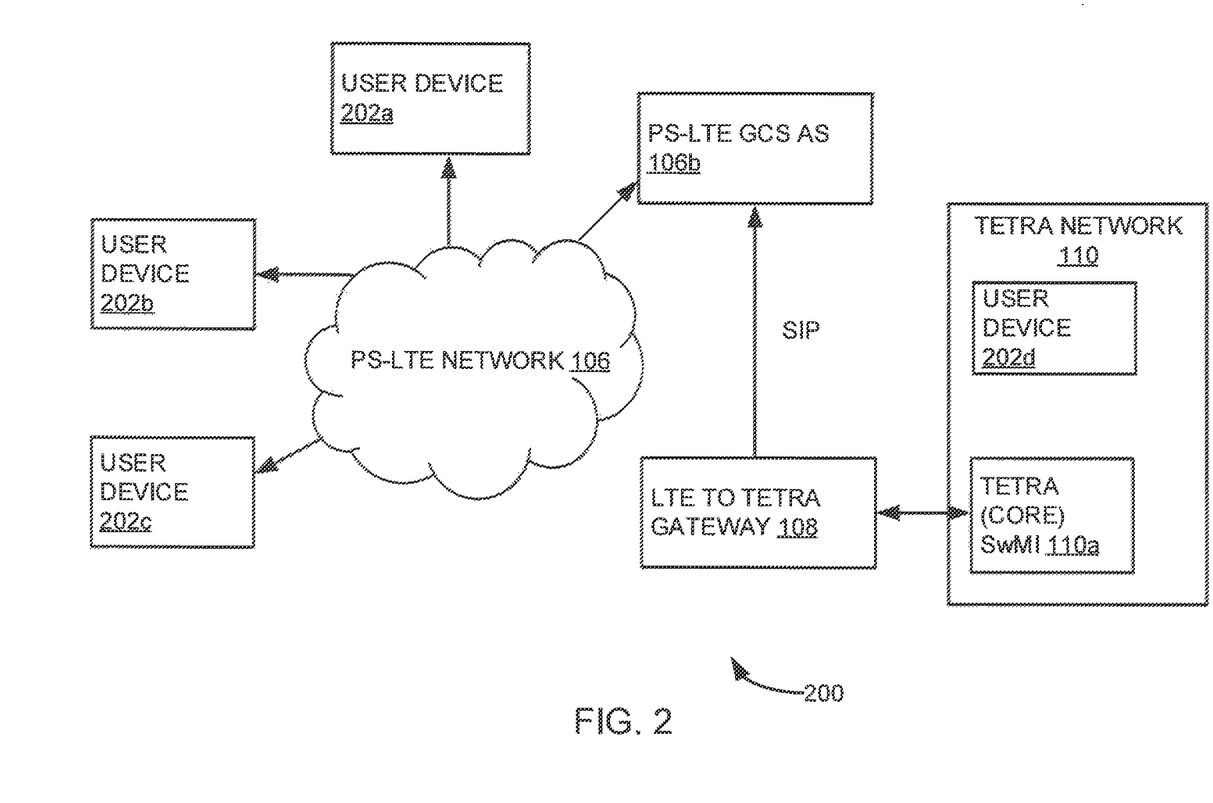
FIG. 2, with reference to FIG. 1, illustrates the network configuration of the ongoing group call in the PS LTE-TETRA networks, according to the embodiments as disclosed herein.

FIG. 2, with reference to FIG. 1, illustrates the network configuration of the ongoing group call in the PS LTE-TETRA networks, according to the embodiments as disclosed herein. As, depicted in FIG. 2, the PS LTE network 106 may include network devices, such as network switches, hubs, routers, HBAs, for providing a communication link between the SS-LE system 102 and the plurality of user devices 202a, 202b, 202c, . . . 202-N.

The PS LTE network 106 may be accessed by multiple user devices 202a . . . 202c, hereinafter collectively referred to as a User Device 202. The TETRA network 110 may be accessed by at least one User Device 202d.

Examples of the User Device 202 may include, but are not limited to, a portable computer with a webcam, a personal digital assistant with a camera, a handheld device with a camera, and a digital camera.

In one implementation, the PS LTE network 106 and the TETRA network 110 may be a wireless network, a wired network or a combination thereof. The PS LTE network 106 and the TETRA network 110 can be implemented as one of the different types of networks, such as intranet, local area network (LAN), wide area network (WAN), the internet, and the like. The PS LTE network 106 and the TETRA network 110 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the PS-LTE network 106 and TETRA network 110 may include a variety of network devices, including routers, bridges, servers, computing devices, storage devices, and the like.

The terms used herein such as 200 OK, SIP 182 QUEUED are SIP message names (This nomenclature of the message is as per the standards). INTERROGATE ACK is a TETRA message name (This nomenclature of the message is as per the standards).

In an implementation aspect, a group call scenario with the TETRA member joining via the SS-LE is described. Initially, a group comprising a plurality of PS-LTE members and TETRA members are formed. The PS-LTE members can be served by the PS-LTE network 106 (PS-LTE-EPC) and the TETRA members can be served by the TETRA network 110. The on-going group call can be hosted by the Group Communication System Enablers for LTE network 106 (GCSE_LTE) on the PS-LTE GCS AS 106b.

The LTE to TETRA gateway 108 is configured as an interworking gateway which can work from the PS-LTE network 106 to the TETRA network 110 and vice versa. Further, the LTE to TETRA gateway 108 is also configured to facilitate the messaging conversion and call completion. As per 3GPP standards, the LTE network 106 can be based on the IP protocol (mainly SIP) while the TETRA network 110 as per ETSI standards is based on either QSGI (Q Signaling) or ISI protocol. QSIG is an ISDN based signaling protocol for signaling between private branch exchanges (PBXs) in a private integrated services network (PISN). It makes use of the connection-level Q.931 protocol and the application-level ROSE protocol.

In an embodiment, the basic mapping of call control messaging can be based on the RFC 4497 (Interworking between the Session Initiation Protocol (SIP) and QSIG) since a TETRA ISI uses QSIG protocol with embedded ISU PDUs (Protocol Data Unit) for signaling. The TETRA Network 110 uses Inter System Interface (ISI) protocol for building a plurality of TETRA messages. This ISI protocol is built on top of the QSIG protocol.

This basic mapping procedure can be used to extend the PS-LTE group call to the TETRA member. A floor control procedure can be established by mapping SIP based floor control procedure (using INFO or MESSAGE SIP methods) or RTCP based floor control to TETRA ISI floor control messages. Further, a voice coder transcoding is also needed on the LTE to TETRA Gateway 108 which will convert the RTP packets to ACELP audio packets and vice versa.

In another embodiment, a group call scenario involving SS-LE service is described as follows; initially a predefined group comprises of the plurality of PS-LTE members and the TETRA members. The PS-LTE member initiates the group call to its predefined members. The signaling and messaging will be performed as per the standards defined by 3GPP for Group Communication System Enablers for LTE (GC-SE_LTE). It has to be assumed in the context of this specification, that from SS-LE perspective an User A shall be a PS-LTE subscriber and the PS-LTE GCS AS 106b will be equivalent to the TETRA (home or controlling) SwMI or an LTE controller (PS-LTE GCS AS 106b) in the ongoing group call. Further, a User B can be served by the TETRA SwMI 110a (Visited SwMI i.e the TETRA core). Additionally, the LTE to TETRA gateway 108 would facilitate the SIP to a TETRA ISI message mapping for the SS-LE service.

In an embodiment, a subscriber using the TETRA Network 110 can be attached to the group call by messaging through the LTE to TETRA Gateway 108. The LTE to TETRA Gateway 108 facilitates the process of message conversion (SIP to TETRA ISI and vice versa) and call completion. The LTE to TETRA Gateway 108 performs the following message mapping:

| SIP Message | TETRA ISI message |
| --- | --- |
| INVITE | ISI-SETUP INITIATE |
| 182 QUEUED | ISI-DELAY |
| 200 OK | ISI-SETUP ACKNOWLEDGEMENT |
| INVITE/NOTIFY (with INFORM4 PDU payload) | ISI-SETUP (with INFORM4 PDU) |
| 200 OK/PUBLISH (with INFORM2 ACK PDU payload) | ISI-FACILITY(With INFORM2 ACK PDU) |
| SUBSCRIBE (with DEFINE PDU payload) | ISI-FACILITY (with DEFINE PDU) |
| 200 OK (with DEFINE ACK PDU payload) | ISI-FACILITY (with DEFINE ACK PDU) |
| OPTIONS (with INTERROGATE PDU payload) | ISI-FACILITY (with INTERROGATE PDU) |
| 200 OK (with INTERROGATE ACK PDU payload) | ISI-FACILITY (with INTERROGATE ACK PDU) |

Figure 3:
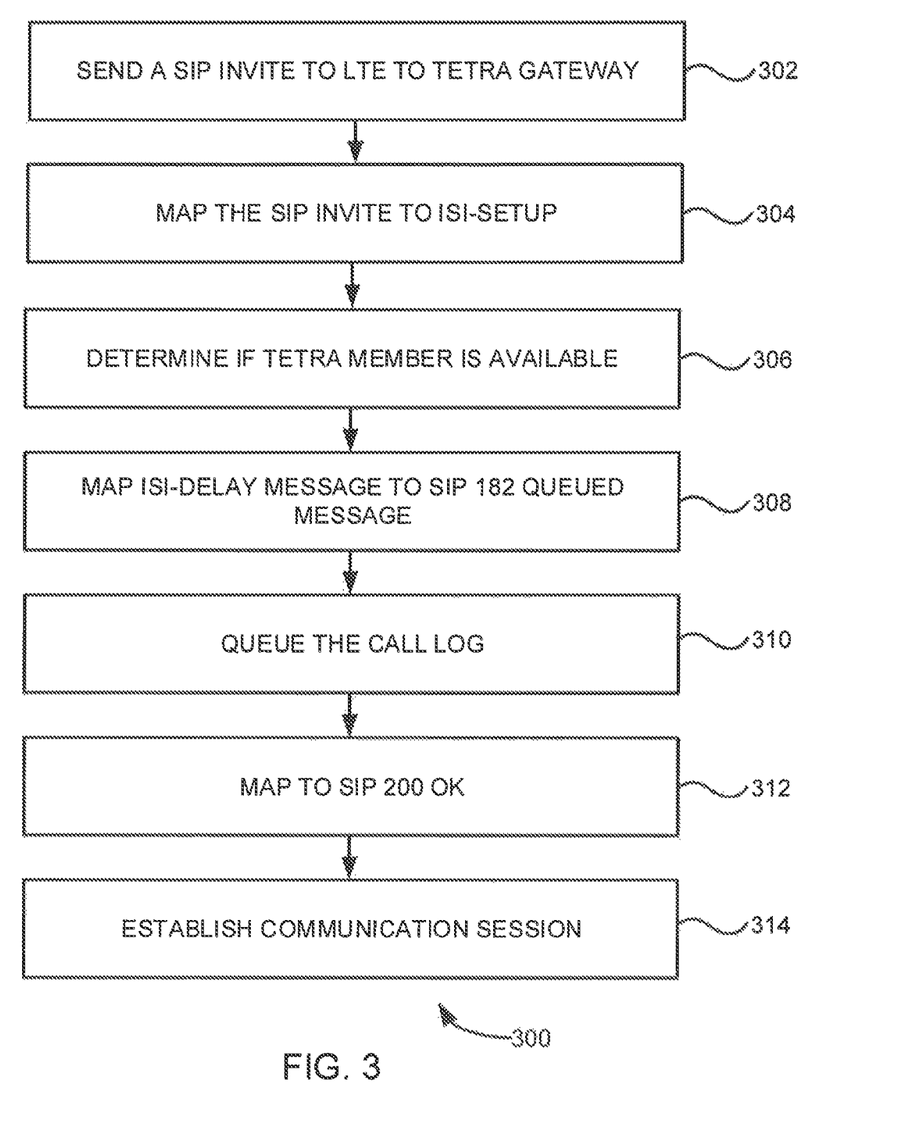
FIG. 3 is a flow diagram describing the process of call queuing at a GCS AS for supplementary service late entry, according to the embodiments as disclosed herein.

FIG. 3 is a flow diagram describing the process of call queuing at a GCS AS for supplementary service late entry, according to the embodiments as disclosed herein. The group call leg to the TETRA members has to be queued at the PS-LTE GCS AS 106b when the SS-LE is enabled and the TETRA member cannot join the call during the call establishment. As depicted in FIG. 3, at Step 302, the PS-LTE GCS AS 106b sends a SIP INVITE to the LTE-TETRA gateway 108 in order to include the TETRA member in the ongoing group call.

At Step 304, the LTE-TETRA gateway 108 maps the SIP INVITE message to the ISI-SETUP INITIATE message and sends it to the TETRA SwMI 110a. At Step 306, the TETRA SwMI 110a determines if the TETRA member is not available or if the TETRA member is busy in other group calls. The TETRA SwMI 110a can also determine if sufficient resources are not available to connect the call and can send an ISI-DELAY message to the LTE to TETRA gateway 108 in order to inform if the call has to be queued.

At Step 308, the LTE to TETRA gateway 108 maps the ISI-DELAY message to the SIP 182 QUEUED message and sends it to the PS-LTE GCS AS 106b. At Step 310, the PS-LTE GCS AS 106b on receiving the SIP 182 QUEUED message would queue a call leg of the call and wait for a notification from the TETRA SwMI 110a for the availability of the TETRA member to join the ongoing group call. At Step 312, once the TETRA member is available then the ISI-SETUP ACKNOWLEDGE received from the TETRA SwMI 110a would be mapped to a SIP 200 OK message and then sent to the PS-LTE GCS AS 106b in order to establish a session for communication with the TETRA SwMI 110a.

At Step 314, once the communication session is established where a plurality of floor control messages can be exchanged between PS-LTE GCS AS 106b and the TETRA SwMI 110 via the LTE to TETRA Gateway 108, followed by the bearer transfer (mapping the RTP bearer packets to TETRA ACELP coded voice packets). The Floor control messages are used for grabbing the floor. Since a group call in the PS-LTE Network 106 is a unidirectional communication (i.e. at a time only one party can transmit voice, all other group members have to be in listen only mode). So the party which wishes to transmit voice grabs the floor first. The party that grabs the floor first for the purpose of transmitting may be referred to as a 'Transmitting party'. Once the floor is grabbed, the PS-LTE GCS AS 106b informs the rest of the group members that they have to be in a listen only mode. The group members can request for the floor but may not get the floor until the transmitting party releases the floor. The various actions in method 300 may be performed in the order presented, in a different order or simultaneously. Further, in some embodiments, some actions listed in FIG. 3 may be omitted.

Figure 4:
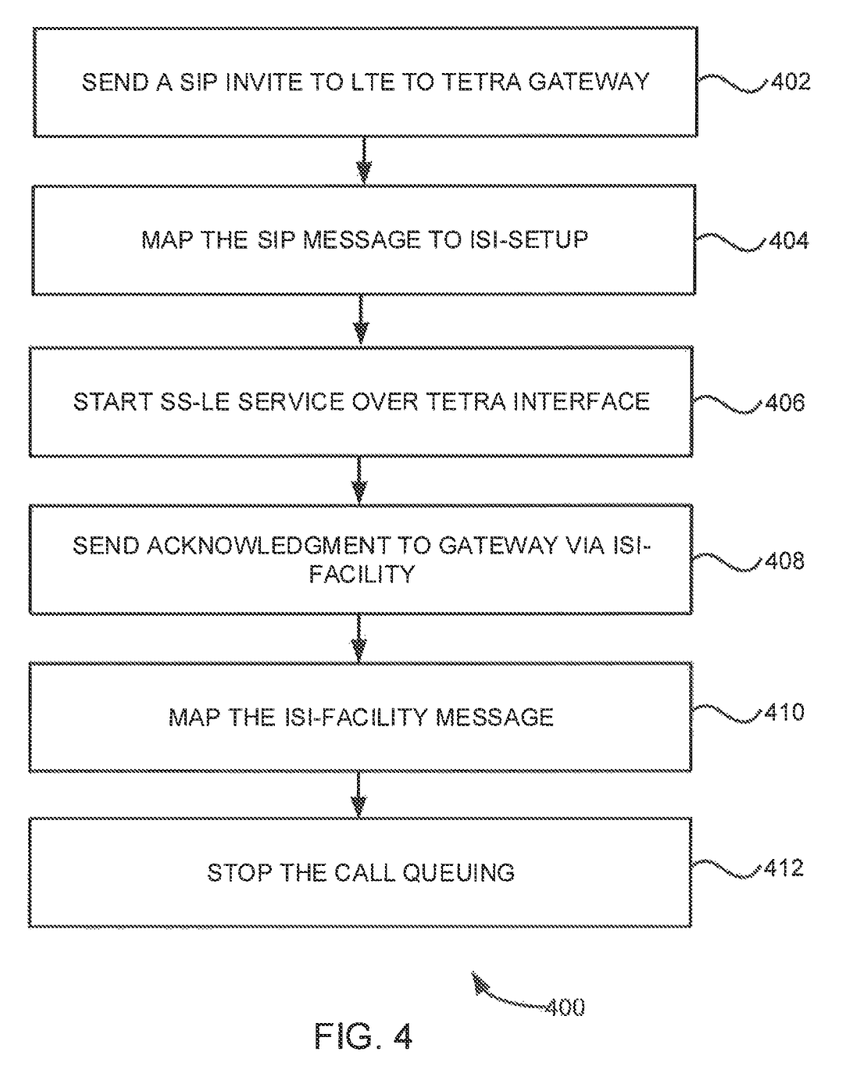
FIG. 4 is a flow diagram depicting the process of informing the TETRA SwMI to activate the SS-LE for the TETRA member, according to the embodiments as disclosed herein.

FIG. 4 is a flow diagram depicting the process of informing the TETRA SwMI to activate the SS-LE for the TETRA member, according to the embodiments as disclosed herein. As depicted in FIG. 4, at Step 402, the PS-LTE GCS AS 106b sends a SIP INVITE OR NOTIFY (with INFORM 4 payload) to the LTE-TETRA Gateway 108 to inform the TETRA SwMI 110a in order to activate the SS-LE service. At step 404, the LTE to TETRA Gateway 108 maps the SIP message to ISI-SETUP message and then sends the mapped SIP message to the TETRA SwMI 110a. At Step 406, the TETRA SwMI 110a initiates the SS-LE service over a TETRA air interface.

At step 408, when the TETRA SwMI 110a receives an acknowledgment from the TETRA member, the TETRA SwMI 110a sends it to the LTE to TETRA Gateway 108 via the ISI-Facility Message (with embedded INFORM 2ACK PDU). At Step 410, The LTE to TETRA Gateway 108 shall map the ISI-FACILITY message (with embedded INFORM 2 ACK PDU) to 200 OK (with INFORM 2 ACK payload) and then sends it to the PS-LTE GCS AS 106b. Finally, at Step 412 on receipt of 200 OK, the PS-LTE GCS AS 106b shall stop the call (leg to TETRA member) queuing and then connect to the TETRA SwMI 110a. The various actions in method 400 may be performed in the order presented, in a different order or simultaneously. Further, in some embodiments, some actions listed in FIG. 4 may be omitted.

The SS-LE PDU specific information can be embedded as a payload in the SIP messaging module 102, according to the embodiment as disclosed herein. When data is sent over the Internet, each unit transmitted includes both header information and the actual data being sent. The header identifies the source and destination of the packet, while the actual data is referred to as the payload In an aspect, any SS-LE specific information/parameters can be transferred from the PS-LTE GCS AS 106b (Application Server/Controller) to the LTE to TETRA Gateway 108 and vice versa, as a payload inside SIP message. On receipt of the payload in SIP message, the LTE to TETRA Gateway 108 configures the TETRA ISI message using the information/parameters derived from the TETRA ISI message and then sends the TETRA ISI message to the TETRA SwMI 110a. In an embodiment, the TETRA SS-LE PDUs can be encoded in UTF-8 (U from Universal Character Set+Transformation Format-8-bi) strings and then embedded in the SIP messaging module 102 (refer, FIG. 1). The basic structure of the embedded payload can be as follows:

```
<?xml version="1.0" encoding="utf-8"?>
<SS_LE_Event>
<action>INFORM2_ACK</action>
<call_identifier>11223344556677
</call_identifier>
</SS_LE_Event>
```

Figure 5:
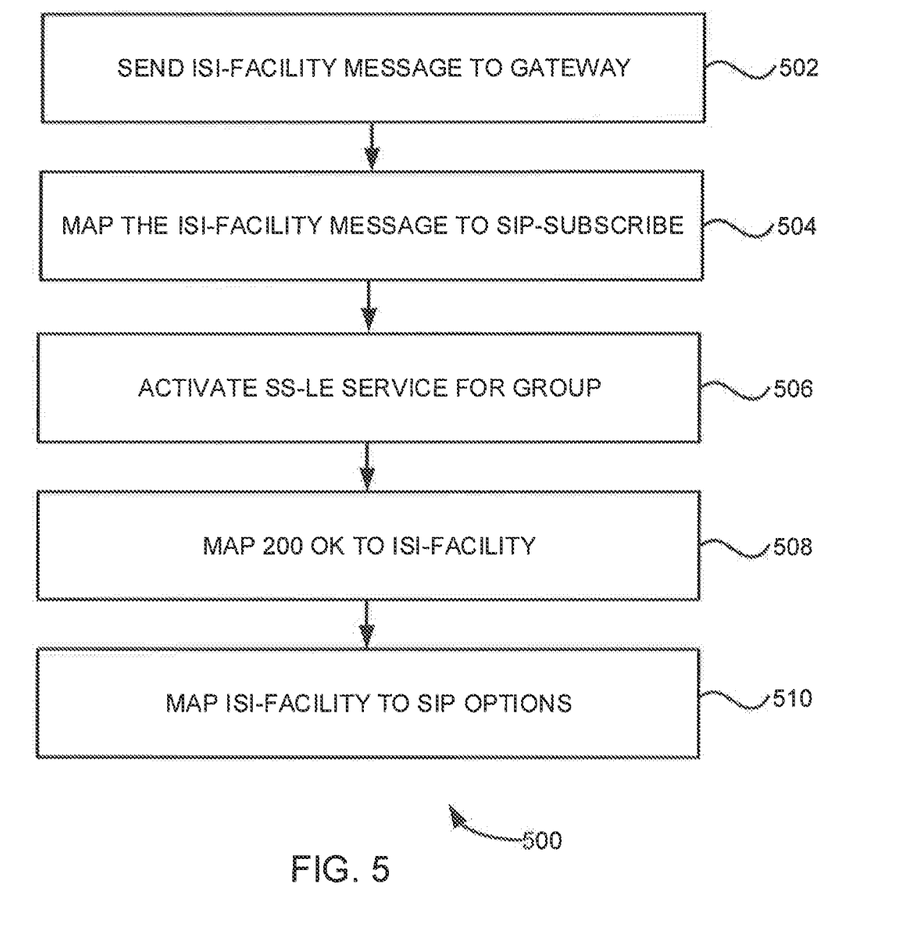
FIG. 5 is a flow diagram depicting the process of defining and interrogating SS-LE service on the PS LTE GCS AS via an authorized user on the TETRA SwMI, according to the embodiments as disclosed herein.

FIG. 5 is a flow diagram depicting the process of defining and interrogating SS-LE service on the PS LTE GCS AS via an authorized user on the TETRA SwMI, according to the embodiments as disclosed herein. In an embodiment using the TETRA Network 110, at Step 502, the TETRA SwMI 110a sends at least one ISI-Facility Message (with embedded DEFINE PDU) to the LTE to TETRA gateway 108. At step 504, the LTE to TETRA gateway 108 maps the ISI-Facility message to a SIP SUBSCRIBE method. On receipt of the SUBSCRIBE method, the PS-LTE GCS AS 106b activates SS-LE service for this group. At step 506, the PS-LTE GCS AS 106b, after activating the SS-LE service for this group sends a SIP 200 OK (with DEFINE ACK payload) to the LTE to TETRA gateway 108.

At Step 508, the LTE to TETRA gateway 108 maps the SIP 200 OK (with DEFINE ACK payload) to the ISI-FACILITY (with DEFINE ACK PDU) and sends the mapped SIP 200 OK to the TETRA SwMI 110a. At Step 510, the ISI-FACILITY (with INTERROGATE PDU) is mapped to the SIP OPTIONS (with INTERROGATE PAYLOAD) and SIP 200 OK (with INTERROGATE ACK payload) is mapped to the ISI-FACILITY (with INTERROGATE ACK PDU) by the LTE to TETRA gateway 108 and then the mapped ISI-FACILITY is sent to the PS-LTE GCS AS 106b and the TETRA SwMI 110a respectively.

In an embodiment, a PS-LTE subscriber can also be an authorized user and in such case, the PS-LTE network 106 can send the SIP-SUBSCRIBE message directly to the PS-LTE GCS AS 106b in order to define the SS-LE service for the group call. In the TETRA network 110, an authorized user can define and interrogate (i.e query) SS-LE service on per group basis. The TETRA network 110 sends a plurality of TETRA messages to the TETRA SwMI 110a. In this aspect of the embodiment, the PS-LTE GCS AS 106b is the controller of the group call, and therefore a plurality of TETRA ISI messages are used to define and interrogate (TETRA) SS-LE services. The SS-LE services are then passed (transferred) from an authorized user (subscriber) to the PS-LTE GCS AS 106b (LTE controller). Further, the LTE to TETRA gateway 108 performs a TETRA ISI to SIP message mapping. In other words, the ISI-FACILITY (with DEFINE PDU) to the SIP SUBSCRIBE method is performed by the LTE to TETRA GATEWAY 108.

In another embodiment, the PS-LTE GCS AS 106b sends a SIP NOTIFY message to the members of the group call, who would prefer to join the on-going group call via the SS-LE service.

In another embodiment, the SS-LE service at the PS-LTE GCS AS 106b can be performed manually, without the authorized subscriber's interaction. The hardware modules involved in the embodiments such as the PS-LTE GCS AS 106b functions as the application server/controller. The TETRA SwMI 110a works as the TETRA core and the LTE to TETRA Gateway 108 facilitates the process of message mapping and protocol conversion.

The embodiments disclosed throughout the specification, preferably enable the (TETRA) SS-LE service to interwork with the PS-LTE GCS AS 106*b*. A vendor independent approach is provided, so that costs related to the vendor lock-in are not incurred. An open standard software solution is suggested so as to reduce costs for vendor implementation. Further, a unique value proposition for PS-LTE network 106 is proposed thereby enabling the subscribers of the PS-LTE network 106 to activate the SS-LE service and allow a plurality of TETRA-LE members to participate in the ongoing (PS-LTE) group calls.

The various actions in method 500 may be performed in the order presented, in a different order or simultaneously. Further, in some embodiments, some actions listed in FIG. 5 may be omitted.

The following implementation details are made in the context of the embodiments disclosed:
  i) The TETRA core (SwMI) 110*a* should be fully ISI compliant. ISI mark is a certification mark for industrial products in India. The mark certifies that a product only confirms to the Indian Standard mentioned as IS:xxxx on top of the mark, developed by the Bureau of Indian Standards (BIS), the national standards body of India
  ii) The Floor control process will be established by mapping SIP based floor control (using INFO or MESSAGE SIP methods) OR RTCP based floor control to TETRA ISI floor control messages.
  iii) PS LTE GCS AS 106*b* will be based on the SIP protocol.
  iv) The Transcoding for RTP audio packets to TETRA ACELP packets will be done using solutions provided by vendors
  v) The Group call member list is already considered as defined in PS-LTE GCS AS 106*b*.

The written description describes the subject matter herein to enable any person skilled in the art to make and use the embodiments and/or the methodology described herein. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means and software means. The method embodiments described herein could be implemented in hardware and software. The device may also include software means. Alternatively, the invention may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method to enable networking and inclusion of at least one TETRA (Terrestrial Trunked Radio) Supplementary Service Late entry (SS-LE) member in a public safety (PS) Long term evolution (LTE) server, said method comprising:
    queuing at least one call at a group call service application server for a SS-LE;
    informing at least one TETRA switching and management interface (SwMI) to activate said SS-LE for a TETRA member;
    embedding a SS-LE protocol data unit (SS-LE PDU) as a payload in a Session Initiation Protocol (SIP) messaging module;
    using a gateway for mapping the SIP to a plurality of Inter systems Interface (ISI) SS-LE messages and performing a voice codec transcoding, wherein said performing includes: at least one of a first Real Time Transport Protocol (RTP) packet is converted to a first Algebraic code-excited linear prediction (ACELP) audio packet and a second ACELP audio packet is converted into a second RTP packet; and
    defining and interrogating said SS-LE service on the group call application server through at least one subscriber on said TETRA SwMI wherein the defining and interrogating further comprises
        sending a plurality of ISI-FACILITY MESSAGES with the embedded SS-LE PDU to a gateway;
        mapping a plurality of ISI-FACILITY MESSAGES to a SIP SUBSCRIBE method, wherein the group call service application server activates the SS-LE on receipt of the SIP SUBSCRIBE method;
        sending a SIP 200 OK with a DEFINE ACK payload to the gateway;
        mapping the SIP 200 OK with said DEFINE ACK payload to the ISI-FACILITY; and
        mapping the ISI-FACILITY to a plurality of SIP options and simultaneously mapping separately the ISI-FACILITY by the gateway.

2. The method as claimed in claim 1, wherein said SS-LE service entry includes:
    a) defining the SS-LE service by using at least one ISI-FACILITY message;
    b) informing the TETRA SS-LE member of at least one on-going group call; and
    c) queuing the said on-going group call at the group call application server.

3. The method as claimed in claim 1, wherein said embedding includes encoding a plurality of said SS-LE PDUs in at least one UTF-8 string and embedding said UTF-8 string in the SIP messaging module.

4. The method as claimed in claim 1, wherein said queuing includes:
    sending at least one SIP INVITE to a gateway for including said TETRA SS-LE member in an on-going group call;
    determining whether said TETRA SS-LE member is available to join said on-going group call;
    mapping a ISI-Delay message to a SIP 182 QUEUED message and sending said SIP 182 QUEUED message to the group call service application server;
    receiving the SIP 182 QUEUED message to queue a call leg for awaiting a notification determining availability of said TETRA SS-LE member;
    mapping a ISI-SET UP ACKNOWLEDGE message received from said TETRA SwMI to a SIP 200 OK and sending said ISI-SETUP ACKNOWLEDGE to the group call service application server for establishing a communication session; and
    exchanging a plurality of floor control messages between the group call service application server and the TETRA SwMI via the gateway.

5. The method as claimed in claim 1, wherein informing includes:
    sending at least one of a SIP INVITE or a SIP NOTIFY message to a gateway for informing the TETRA SwMI to activate said SS-LE;
    mapping a plurality of SIP messages to a plurality of ISI-SETUP messages for sending the mapped messages to the TETRA SwMI;
    initiating the SS-LE by the TETRA SwMI over a TETRA air interface;
    mapping a ISI-FACILITY message to at least one of a SIP 200 OK or a SIP PUBLISH message by the gateway for sending it to the group call service application server; and
    stopping the queuing and connecting to the TETRA SwMI by the group call service application server.

6. A system for enabling networking and inclusion of at least one TETRA (Terrestrial Trunked Radio) Supplementary Service Late Entry (SS-LE) member in a public safety (PS) Long Term Evolution (LTE) server, said system comprising:
    a group call application server configured to function as a controller for at least one group call, wherein said group call is hosted on the group call application server;
    a TETRA Switching and Management Interface (SwMI) configured to function as a TETRA core, wherein said TETRA SwMI serves at least one TETRA member;
    a Session Initiation Protocol (SIP) messaging module to embed a SS_LE protocol data unit (SS-LE-PDU) as a payload;
    a gateway configured to convert to perform a voice codec transcoding, wherein said performing includes: at least one of a first Real Time Transport Protocol (RTP) packet is converted to a first Algebraic code-excited linear prediction (ACELP) audio packet and a second ACELP audio packet is converted into a second RTP packet;
    the group application server configured to define and interrogate the SS-LE service through at least one subscriber on the TETRA SwMI wherein the defining and interrogating further comprises sending a plurality of ISI-FACILITY MESSAGES with the embedded SS-LE PDU to a gateway;
mapping a plurality of ISI-FACILITY MESSAGES to a SIP SUBSCRIBE method, wherein the group call service application server activates the SS-LE on receipt of the SIP SUBSCRIBE method;
sending a SIP 200 OK with a DEFINE ACK payload to the gateway;
mapping the SIP 200 OK with said DEFINE ACK payload to the ISI-FACILITY; and
mapping the ISI-FACILITY to a plurality of SIP options and simultaneously mapping separately the ISI-FACILITY by the gateway;
an Inter System Interface (ISI) protocol configured to build a plurality of TETRA messages by using a TETRA network.

7. The system as claimed in claim 6, wherein said TETRA SwMI performs an air interface signaling process towards the TETRA member.

8. The system as claimed in claim 6, wherein said gateway is configured to work as an interworking gateway from a PS-LTE network to the TETRA network.

9. The system as claimed in claim 6, wherein said gateway is configured to facilitate a messaging conversion and a call completion, further wherein, the gateway facilitates a SIP to a TETRA ISI MESSAGE mapping for the SS-LE service.

10. The system as claimed in claim 6, wherein said group call application server is configured to send at least one SIP NOTIFY message to a plurality of members of an ongoing group call.

11. The system as claimed in claim 6, wherein said group call application server and said TETRA SwMI establishes a communication session by exchanging a plurality of floor control messages.

12. The system as claimed in claim 11, wherein said group call application server informs a plurality of members of the ongoing group call to remain in a listen-only mode, once a floor is grabbed.

13. The system as claimed in claim 6, wherein the TETRA SwMI is further configured to determine whether a predetermined number of resources are available to connect to the ongoing group call.

14. The system as claimed in claim 13, wherein the TETRA SwMI is further configured to a send an ISI-DELAY message to the gateway.

15. A non-transitory computer readable medium embodying a program executable in a computing device for enabling networking and inclusion of at least one TETRA (Terrestrial Trunked Radio) Supplementary Service Late Entry (SS-LE) member in a public safety (PS) Long Term Evolution (LTE) server, said system comprising:
a group call application server configured to function as a controller for at least one group call, wherein said group call is hosted on the group call application server;
a TETRA Switching and Management Interface (SwMI) configured to function as a TETRA core, wherein said TETRA SwMI serves at least one TETRA member;
a Session Initiation Protocol (SIP) messaging module to embed a SS_LE protocol data unit (SS-LE-PDU) as a payload;
a gateway configured to convert to perform a voice codec transcoding, wherein said performing includes: at least one of a first Real Time Transport Protocol (RTP) packet is converted to a first Algebraic code-excited linear prediction (ACELP) audio packet and a second ACELP audio packet is converted into a second RTP packet; and
the group application server configured to define and interrogate the SS-LE service through at least one subscriber on the TETRA SwMI wherein the defining and interrogating further comprises
sending a plurality of ISI-FACILITY MESSAGES with the embedded SS-LE PDU to a gateway;
mapping a plurality of ISI-FACILITY MESSAGES to a SIP SUBSCRIBE method, wherein the group call service application server activates the SS-LE on receipt of the SIP SUBSCRIBE method;
sending a SIP 200 OK with a DEFINE ACK payload to the gateway;
mapping the SIP 200 OK with said DEFINE ACK payload to the ISI-FACILITY; and
mapping the ISI-FACILITY to a plurality of SIP options and simultaneously mapping separately the ISI-FACILITY by the gateway;
an Inter System Interface (ISI) protocol configured to build a plurality of TETRA messages by using a TETRA network.

* * * * *